United States Patent
Jiang et al.

(10) Patent No.: US 7,944,158 B2
(45) Date of Patent: May 17, 2011

(54) CONTROLLED ELECTRIC MOTOR ARRANGEMENT FOR A TENSION MECHANISM

(75) Inventors: Jinsheng Jiang, Nürnberg (DE); Viktor Barinberg, Nürnberg (DE)

(73) Assignee: Baumuller Nurnberg GmbH, Nuremberg (DE)

( * ) Notice: Subject to any disclaimer, the term of this patent is extended or adjusted under 35 U.S.C. 154(b) by 424 days.

(21) Appl. No.: 12/238,860

(22) Filed: Sep. 26, 2008
(Under 37 CFR 1.47)

(65) Prior Publication Data
US 2009/0102402 A1  Apr. 23, 2009

(30) Foreign Application Priority Data

Sep. 27, 2007 (DE) .................. 10 2007 046 681
Sep. 27, 2007 (EP) ...................... 07117386

(51) Int. Cl.
*H02P 5/00* (2006.01)

(52) U.S. Cl. ............... 318/85; 318/34; 318/40; 318/48; 318/700; 318/400.01; 318/66; 318/539; 74/422; 74/640; 74/83; 310/112; 310/114; 310/115; 701/41; 701/43

(58) Field of Classification Search .............. 318/34, 318/40, 48, 85, 98, 700, 400.1, 539; 701/41, 701/43; 310/112, 114, 115; 74/422, 640, 74/83
See application file for complete search history.

(56) References Cited

U.S. PATENT DOCUMENTS

| | | | | |
|---|---|---|---|---|
| 3,839,730 A | * | 10/1974 | Watanabe | 360/71 |
| 4,106,725 A | * | 8/1978 | Richt | 242/356.5 |
| 4,390,909 A | * | 6/1983 | Sakamoto | 360/71 |
| 4,653,885 A | * | 3/1987 | Araki et al. | 396/388 |
| 5,788,058 A | * | 8/1998 | Girardey | 198/813 |
| 6,960,145 B2 | * | 11/2005 | Fraley et al. | 474/134 |
| 7,222,008 B2 | * | 5/2007 | Takahashi et al. | 701/41 |
| 7,591,204 B2 | * | 9/2009 | Ueno et al. | 74/388 PS |
| 7,635,963 B2 | * | 12/2009 | Shinmura et al. | 318/802 |

(Continued)

FOREIGN PATENT DOCUMENTS

DE  101 03 667 A1  8/2002

(Continued)

*Primary Examiner* — Rita Leykin
(74) *Attorney, Agent, or Firm* — Frank H. Foster; Kremblas & Foster

(57) ABSTRACT

A field-oriented control method for an electric drive comprising a plurality of electric motors, for implementing a tension mechanism, especially for load cable and/or gearing means, using measurements of a polyphase motor actual current. The measured values are transformed into a direct current component and a quadrature current component, based upon a magnetic rotor field or flux angle, in a rotor flux-based d,q coordinate system. The quadrature and direct current components from the actual current are subjected to a comparison with predetermined quadrature and direct current components of a current command value. The method has the following steps:
a) two synchronous motors are used as electric motors;
b) the magnet wheels or rotors of the two synchronous motors are rotated or oriented toward one another and are then mechanically coupled in such a way that between their magnetic flux linkages or other magnetic fluxes an angular offset is formed;
c) the two synchronous motors are each supplied with or traversed by the same phase currents, from a shared power converter;
d) for a pretension torque, a command or reference value is predetermined, and is superposed on a motor torque control value output by a controller, from which a quadrature current component for the current command value is derived;
e) a direct current component for the current command value is derived from the predetermined tension torque control value with sign reversal.

30 Claims, 7 Drawing Sheets

Tensioning Drive

Figure 1:
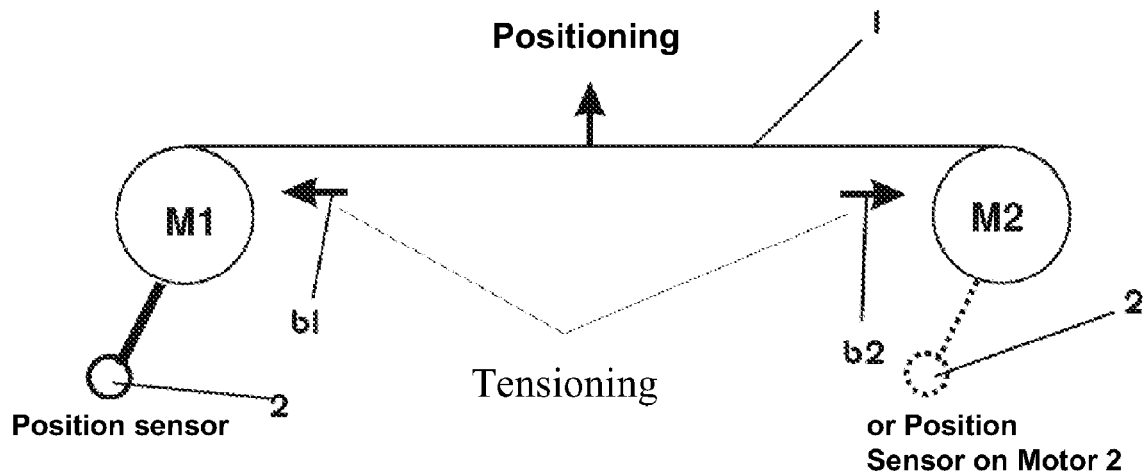

U.S. PATENT DOCUMENTS 7,834,494 B2 * 11/2010 Blanding et al. ............ 310/68 B

FOREIGN PATENT DOCUMENTS

| DE | 10103667 | A1 | 8/2002 |
| DE | 10223139 | A1 | 12/2003 |
| DE | 102006016936 | A1 | 11/2006 |
| DE | 102005045835 | A1 | 3/2007 |

* cited by examiner

Tensioning Drive

Start-Up Process for Tension Drive

1.) S1 closed, S2 open, therefore only M1 is controllable
2.) Move M1 (with sensor) to old position (position before current off)
3.) S1 open, S2 closed, therefore only M2 is controllable and M1 is in short-circuit operation
4.) M2 (sensorless operation) pulls, until M1 (with sensor) moves somewhat
5.) KTY: temperature sensor

CONTROLLED ELECTRIC MOTOR ARRANGEMENT FOR A TENSION MECHANISM

CROSS-REFERENCES TO RELATED APPLICATIONS

This application claims foreign priority benefits under 35 U.S.C. 119(a)-(d) or (f) of application number 07 117 386.8 filed in the European Patent Office on Sep. 27, 2007 and application no. 10 2007 046 681.3 filed in the German Patent Office on Sep. 27, 2007 which are herein incorporated by reference.

STATEMENT REGARDING FEDERALLY-SPONSORED RESEARCH AND DEVELOPMENT (Not Applicable)

REFERENCE TO AN APPENDIX (Not Applicable)

The invention relates to a field-oriented method for controlling an electric drive comprising a plurality of electric motors, for example for implementing a tension mechanism, especially for load cable and/or gearing means. In the control method, measurements are taken of an actual polyphase motor current. The measured values are transformed into a direct current component and a quadrature current component, based upon a magnetic rotor field angle or flow angle, in a rotor-based d,q coordinate system. The measured quadrature current component is compared with a predetermined transverse current component of a current command value, to obtain a command value for motor current control.

The invention further relates to an electric motor arrangement that is suitable especially for implementing the control method, with at least two electric motors that can be operated as polyphase motors. The invention also relates to a position and/or speed controller for the field-oriented control of an electric drive, which is suitable especially for use in the aforementioned control method or the aforementioned electric motor arrangement.

The invention further relates to an start-up method for a tensioning drive and a therefor set up arrangement of electric motors.

For a steer-by-wire steering system, a steering actuator is proposed (DE 101 03 667 A1), in which two electric motors are provided. The pinions of the electric motors act upon a gear wheel, which drives, for example, a rack-and-pinion steering transmission or a steering column to which a steering wheel is attached. When the actuator is required to generate only low levels of torque, then the two electric motors are controlled in such a way that they are displaced in relation to one another, therefor no play occurs in the gearing between pinion and gear wheel. This is ensured when the tooth flanks of the pinion and the gear wheel lie against one another with zero play. The zero-play drive of the gear wheel can be achieved through the suitable control of the two electric motors, in which the directions of rotation of the two electric motors are oriented toward one another. It is further proposed that each of the two electric motors be provided with a rotor position sensor, as a redundancy provision against a possible failure of one of the two electric motors.

In contrast to this, in the interest of efficient control of the multi-motor electric drive, the control method disclosed in claim 1 is proposed. An electric motor arrangement that is suitable for implementing the control method is disclosed in independent claim 11. A position and/or speed controller, which also falls under the general idea of the invention, is defined in independent claim 22. Optional, advantageous exemplary embodiments of the invention are found in the dependent claims.

The invention comprises the basic idea of connecting two synchronous motors in series by their phase windings, thereby allowing their two magnet wheels and rotor magnetic fluxes to rotate with a phase or angular offset in relation to one another. The use according to the invention of two synchronous motors, which are characterized by effective controllability, a high level of efficiency and a high power factor, while at the same time having a low construction volume, contributes to increased efficiency, resulting in advantages for servo applications as with tension mechanisms. Especially, synchronous machines are characterized by a rotating main field, which is fixed to the rotor, and the magnetic flux linkage is very often based on permanent magnets, which are mounted on the surface of the rotor and result in a nearly constant rotor flux, which facilitates controllability.

With the method of the invention, the magnet wheels or rotors of the two synchronous motors are offset in relation to one another with their magnetic flux linkages or other magnetic alignments at an angle, so that one and the same phase current can act in one motor as a flux-forming (direct) current component and in the other motor as a torque-forming (quadrature) current component. The phase or angular offset is defined with respect to stationary or permanent coordinates, especially with respect to a stator-based coordinate system.

This paves the way for the next method feature according to the invention, namely that the two synchronous motors are supplied with the same phase current from a single, shared power converter. Therefor, only a single power converter, especially a frequency converter or an inverter, is required, which provides a substantial savings in terms of structural components.

In the context of the control according to the invention, a reference or command value for a prestress or tension torque is predetermined, which on one hand is superposed by the quadrature current component of the current command value. On the other hand, this predetermined tension torque command value, with an opposite sign, is used at the same time as a command value for the direct current component. Because of the aforementioned angular offset of the magnetic flux, this direct current component acts in the second synchronous motor as a torque-forming quadrature current component, whereas the quadrature current component that is applied to the first motor then gives rise to the flux-forming directl component in the second motor.

In this manner, a coordinated and synchronized movement of the electric motors can be achieved, which is especially well suited for implementing a tension mechanism for the purpose of eliminating play in gearing or cable means. The coordination of the motion sequences is based upon the coupling of the respective flux linkages of the synchronous motors through angular offset, wherein one and the same phase current functions as a quadrature current component in one motor, and as a direct current component in the other motor.

To simplify the complexity in terms of control technique, it is desirable to keep the angular offset of the respective magnetic fluxes of the rotors of the synchronous motors and the command value for the pretension torque, constant during continuous operation. In this manner, the respective phase current of the two synchronous motors can be easily and systematically adjusted to predetermined control values.

The synchronous motor arrangement that lies within the scope of the general idea of the invention is characterized by its series connection. This can be implemented in that the second synchronous motor is connected via the leads of its phase windings to the ends of the phase windings of the first synchronous motor, which is in turn connected via the leads of its phase windings to the power converter. This results in a coupling of the two synchronous motors with the shared power converter. With this series connection of power converter, especially inverter, first synchronous motor and second synchronous motor, the method feature of the invention is achieved in that the same phase current flows through both motors. In this case, only one of the two synchronous motors is connected directly to the shared power converter. Therefor, the synchronous motors are coupled with one another serially via their phase windings in such a way that each synchronous motor is supplied with the same phase currents from the shared power converter.

What is important is that the magnetic alignments of the magnet wheels or rotors of the two synchronous motors are offset not in phase, but in relation to one another at an offset angle. In principle, this angle can measure between 0 and ±180°, thus for example ±45°. In practical use, angular offsets of 90° have proven to be optimal.

To implement the phase displacement or angular offset between the magnetic flux linkages or magnetic alignments of the two synchronous motors, a mechanical coupling is used, according to the invention, which can be implemented, for example, using cable or gearing means between the rotors or magnet wheels. This implementation is also efficient for the "tension mechanism" application according to the invention, because the mechanical coupling can then be produced using the load cable means or the gearing wheel or other gearing means. If the load cable means or the gearing means are tensioned, then the mechanical coupling between the rotors of the synchronous motors, and therefor also the angular offset between their flux linkages or magnetic flux alignments, are established or defined.

The basic principle of the invention presents not only the embodiment of the dual-electric-motor drive having only one inverter or power converter, but also the fact that only one of the two synchronous motors is equipped with a position sensing device (sensor system and/or motor model). This consequently results in the further embodiment of the invention, which reduces the number of components and is therefor cost effective, in which a controller that controls an inverter is allocated to both synchronous motors within the framework of a drive control circuit. The additional savings in terms of components and costs, combined with an increase in technical reliability, is obvious.

A further problem solved by the invention consists in that the tension drive according to the main invention has no defined status in its initial state without current flow. The magnet wheels of the two synchronous motors can be freely rotated counter to one another, without requiring the desired phase displacement of preferably 90° between the two magnet wheels. A further object of the invention is therefor to achieve that, during start-up, the desired phase displacement is generated between the magnet wheels of the two synchronous motors in the tensioning drive.

This object is achieved by the operating method indicated in claim 5. Optional advantageous embodiments are defined in the dependent operating method claims. Suitable applications: Start-up method for the tension of machine elements and assemblies that are subject to play, such as gear mechanisms, mechanical_transmissions and coupling elements, preferably with reversal play and reversal motion or arrangements, which in the untensioned state do not occupy a clearly defined position.

The operating method of the invention is provided for a drive for tensioning an object being flexible or having play (backlash, clearance) as at least two electric motors that can be operated as polyphase motors are tackling said object by opposed forces. A control and/or regulating device is used to control the electric motors. For start or starting up when the tensioning drive is in an idle or currentless switched-off state, first only one of the two electric motors is actuated to a tensioning movement until a pre-specified first stop criterion is detected by the control and/or regulating device. Thereafter, optionally, the second electric motor is actuated to a tensioning movement, until a pre-specified second stop criterion is detected by the control and/or regulating device. The method of the invention for controlled start-up of a drive system, comprised of a drive motor and a tensioning motor, comprises the steps: when starting-up from the currentless mode, first the tensioning torque is generated, in order to bring the element to be tightened into a defined position; then allowing a transition into the intended operation.

According to an exemplary embodiment of the invention, during the actuation of the first or second electric motor, the respective other electric motor is short-circuited and/or otherwise decoupled from the control and/or regulating device. This is based on the fact that a short-circuited three-phase motor behaves like an electrodynamic brake. Accordingly, while actuating one of the electric motors, the respective other motor is used as an electrodynamic brake by a short-circuiting (S1, S2) of its phase windings. Advantageously, an increase in the motor current flow and/or achieving a predetermined motor position and/or a predetermined timing period serves as a stop criterion. Advantages of the multi-motor arrangements of the invention: individual control of two series connected motors via a single converter; generation of an effective braking moment by simply short-circuiting of the motor windings.

In context with the operating method of the invention, it is advantageous when the phase windings of one or both electric motors are equipped with switching elements, which are arranged for decoupling one or both electric motors from the control and/or regulating device.

A control structure according to independent claim 13, which is functionally adapted to the invention, comprises a device for generating a prestress or tension torque command value or reference value. On one hand, its output is superposed by a controller output for the motor torque, which is known in the art; on the other hand, the tension torque controller output—with sign reversal—is made available for further methoding as a direct current component, expediently after being weighted with the reciprocal value of the motor flux linkage. Thus, it can be subjected to a command value/ actual value comparison with a measured actual value for the direct current component, and the difference is fed to a current controller, in a known manner. The respective d or q control current resulting from direct or quadrature current controllers acts in one synchronous motor to form flux and in the other synchronous motor to form torque.

The technical reliability and operational safety, especially for the "tension mechanism" application, can be increased with an optional, advantageous embodiment of the invention, in which the quadrature and direct current command value outputs are each equipped with a limiter element. Each such element is configured to restrict the allocated command value output to a range having uniform signs. According to the invention, the signs of the two command value outputs are kept opposite one another by the limiter elements. The advantage achieved with this is that the mechanical coupling, and therefor a phase shift or an offset angle between the magnetic flux linkages of the two synchronous motors, is always ensured, so that one and the same phase current can act to form torque in one synchronous motor and to form flux in the other synchronous motor. Furthermore, in the application involving "tension of a flexible band or some other soft line," sagging can be ruled out with a high degree of reliability.

To be able to utilize the motor torque range to the fullest possible extent, one embodiment of the speed controller of the invention is proposed, in which the output of the motor torque control and/or command value generator is supplied, preferably in full, not only to the branch of the quadrature current command value component, but also to the branch of the direct current component command value. Expressing this idea in concrete terms, a summing point is provided for this purpose, with the motor control torque and, with a negative sign, the pretension torque being supplied to its two inputs. From the difference the direct current component is derived using a reciprocal weighting with a value for a flux linkage (which is determined based upon the circumstances of the individual technical case). Because, with this particularly advantageous embodiment, the motor torque control value is methoded and/or used to generate and output not only the quadrature current component command value but also the direct current component command value the available torque control range can be activated or controlled or utilized up to 100% in both directions.

According to another advantageous embodiment of the invention, a pretension torque is set, which corresponds to approximately 50% of the maximum possible motor torque. With this, at least approximately 50% of the maximum possible motor torque can still be activated or controlled in both directions, even without the above-described branching-off of the motor torque command value.

Figure 2:
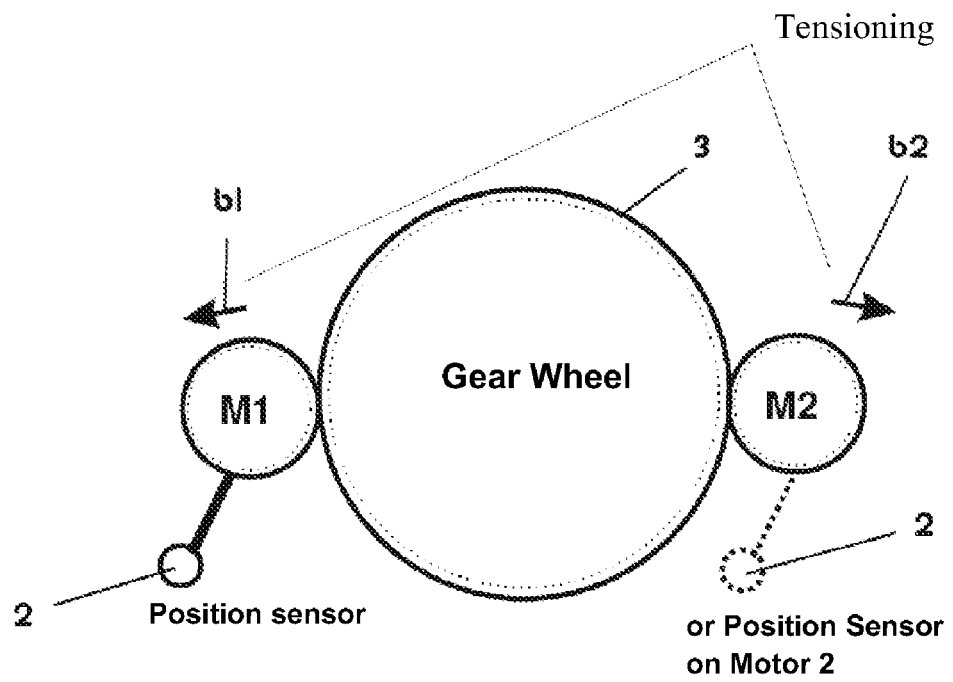
Figure 3:
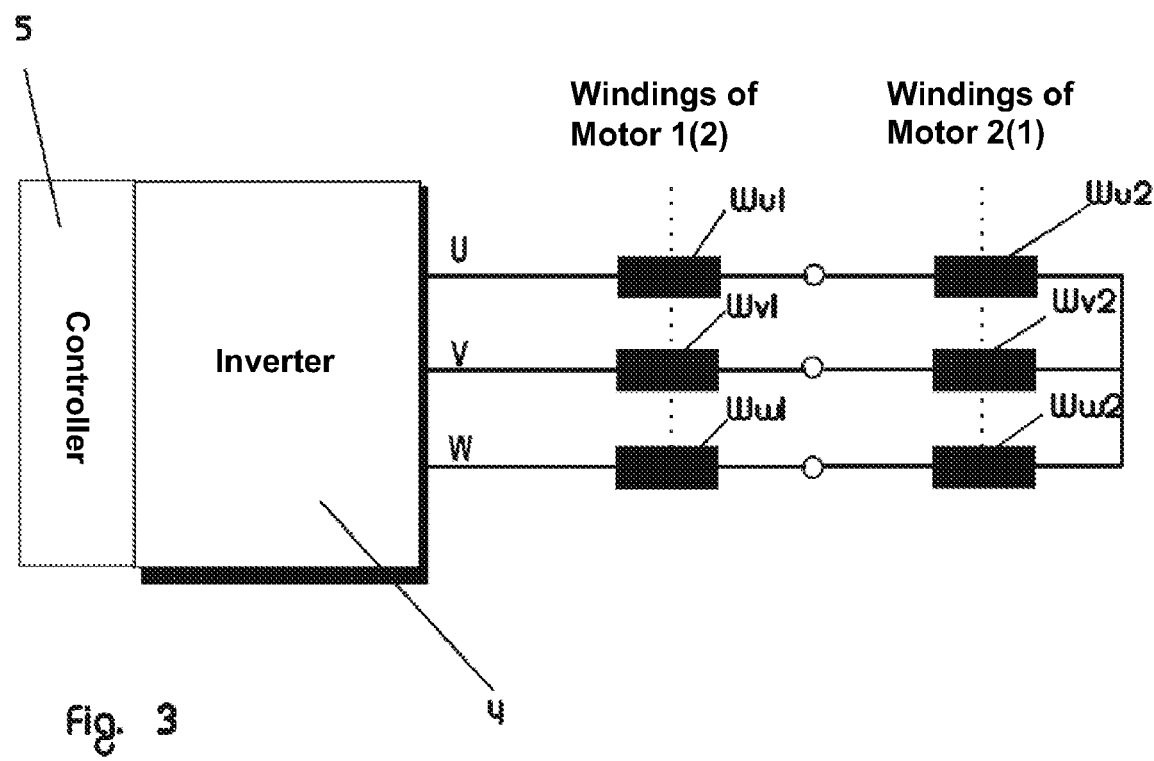
Figure 4:
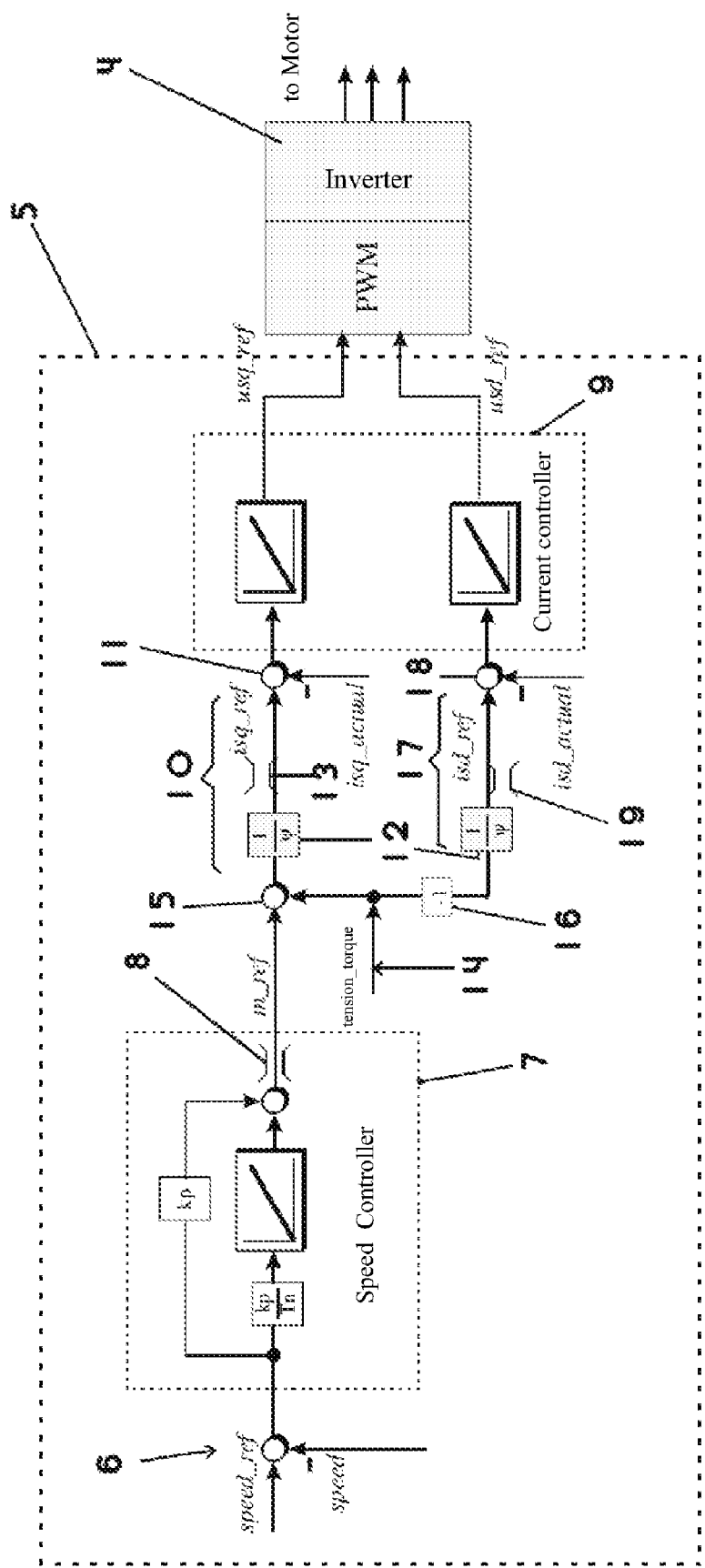
Figure 5:
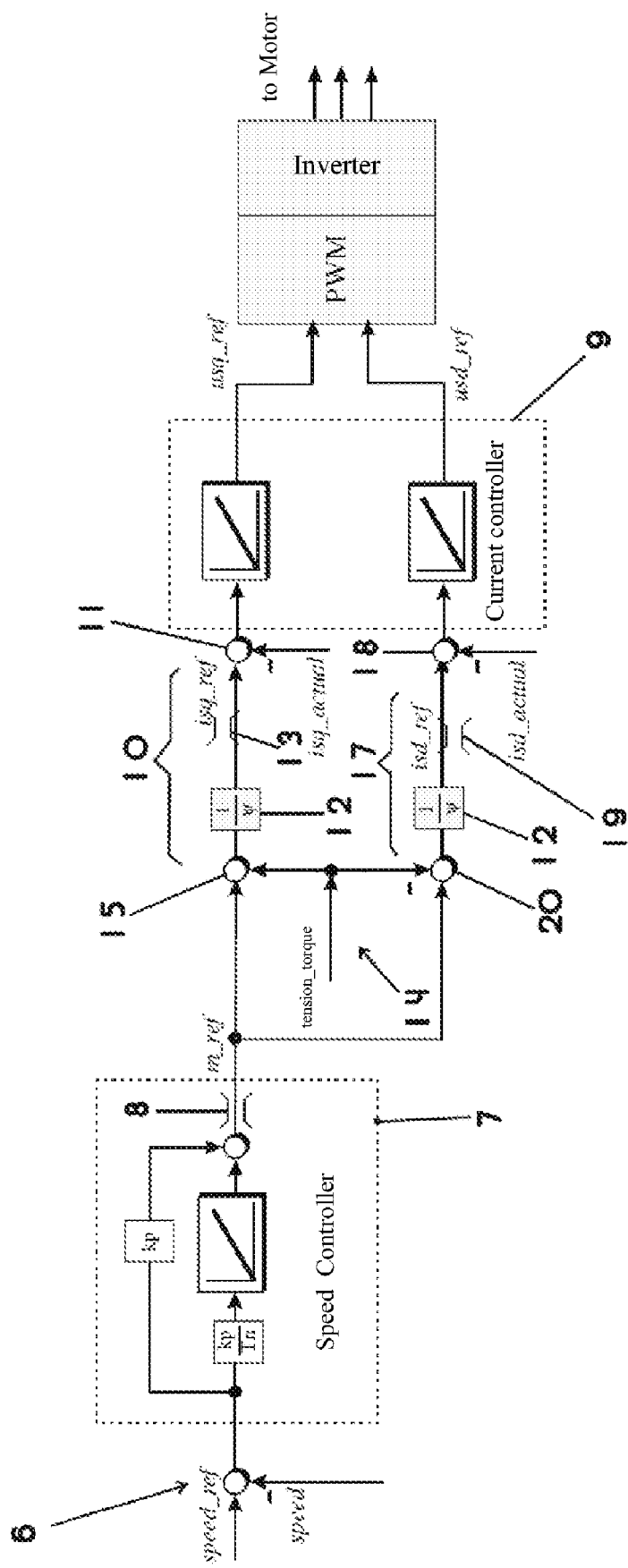
Figure 6:
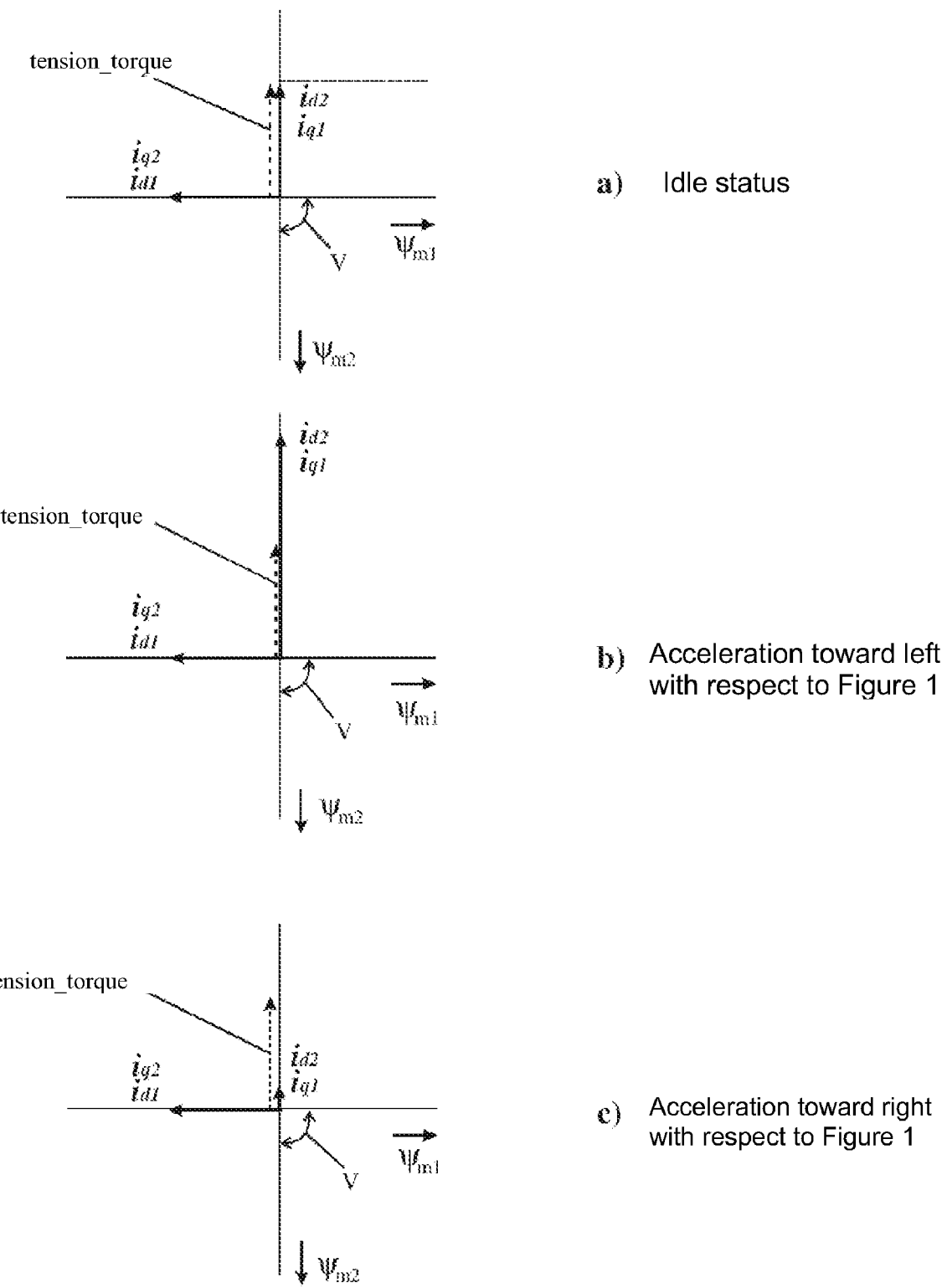

Further details, characterizing features, combinations of features, advantages and effects based upon the invention may be found in the following description of preferred embodiments of the invention, and in the set of drawings. The drawings, each a schematic representation, show:

FIG. 1 a sketch outlining the device engineering principle of an application according to the invention involving the tension and positioning of a tension cable, FIG. 2 a sketch outlining the device engineering principle of an application according to the invention for tension a train of gears, FIG. 3 an electrical arrangement of the tension drive, FIG. 4 a block diagram of a control structure, adapted in terms of the function of the invention, FIG. 5 a block diagram of an additional control structure, adapted in terms of the function of the invention, FIGS. 6a-6c current and flux vector diagrams for various applications.

Figure 7:
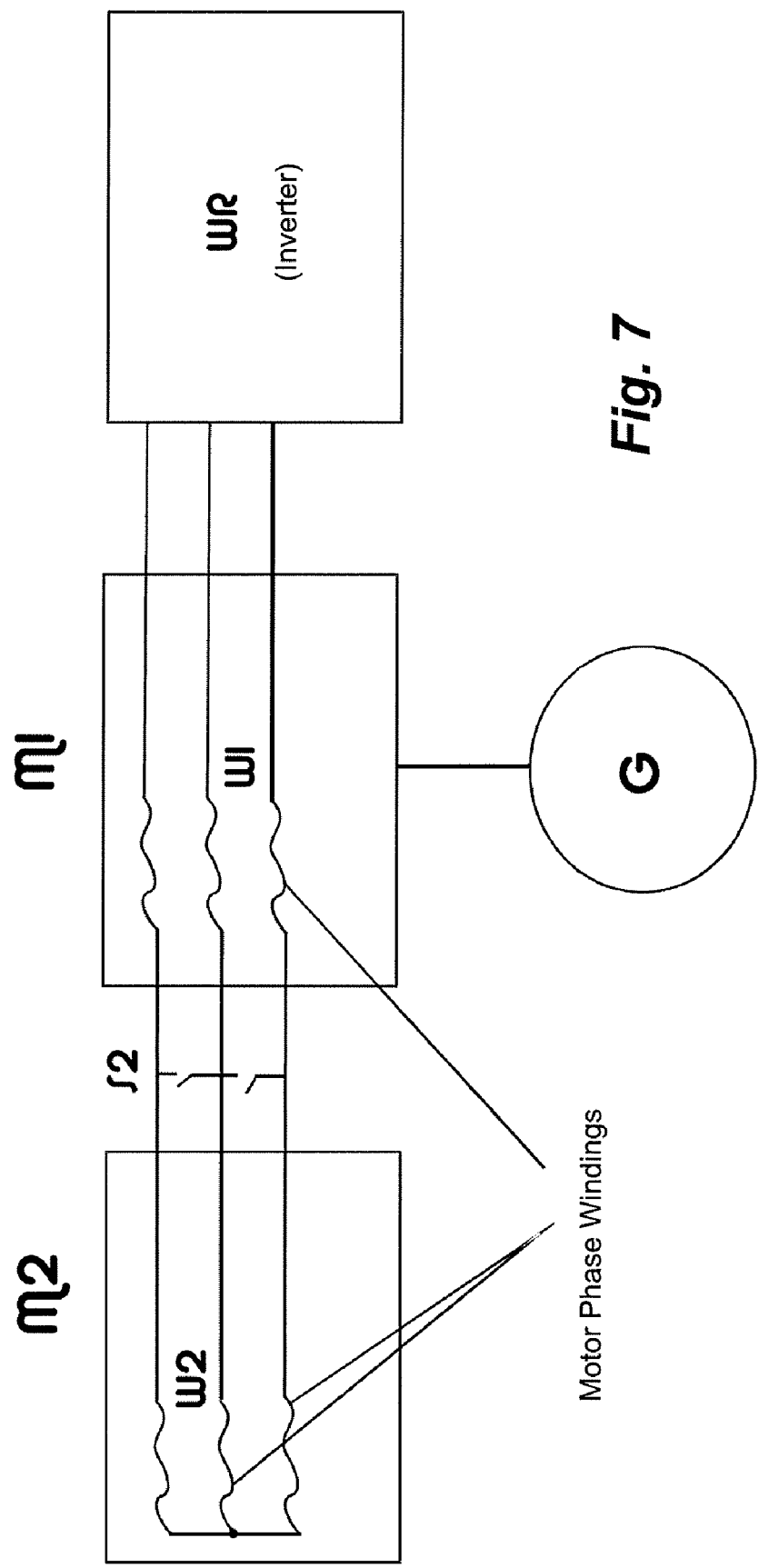

FIG. 7 an electric motor arrangement for carrying out the operating method

Figure 8:
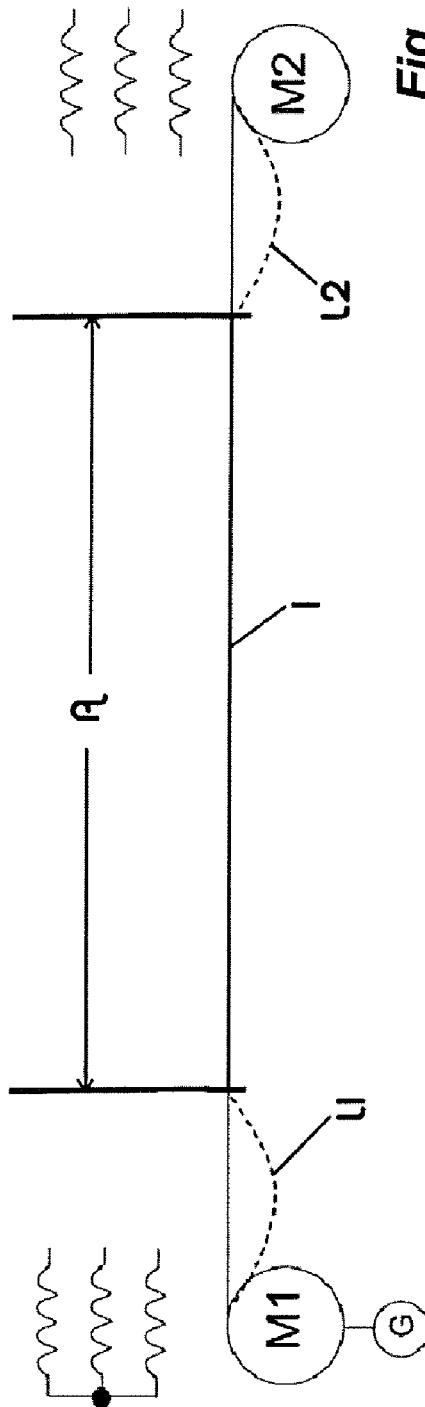

FIG. 8 a device sketch for the approach according to the the operating method

Figure 9:
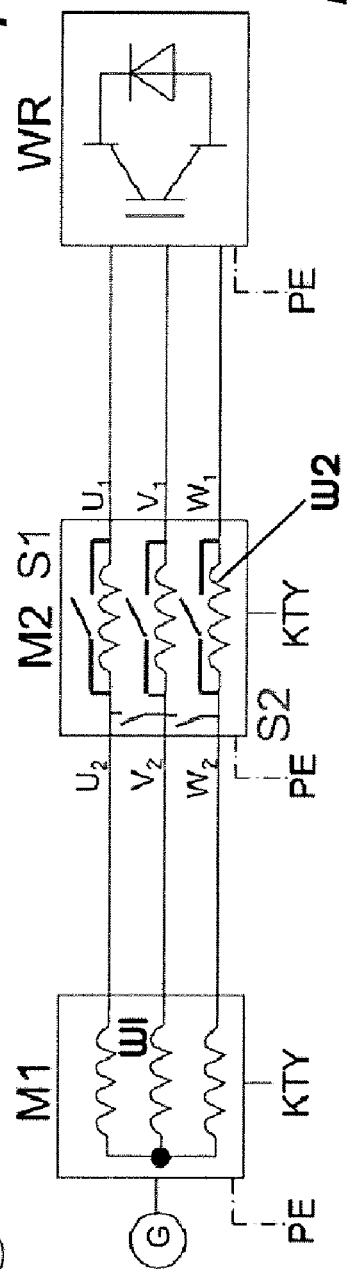

FIG. 9 an alternative electric motor arrangement for carrying out the operating method According to FIG. 1, the respective rotors (not shown) of two synchronous motors M1, M2 are mechanically coupled via a tension line 1, which is suitable for a variety of purposes. If the two synchronous motors M1, M2 are controlled using opposing torques (see below), opposing accelerations b1, b2 are applied to the ends of the tension line 1 via the respective rotors of the synchronous motors M1, M2. This results in a tension of the tension line 1, for example a tension cable or tension band, so that sagging between the synchronous motors M1, M2 is prevented. Additionally, the tension causes the respective rotors of the synchronous motors M1, M2 to be held in place in their angular position in relation to one another. According to the invention, this fixing in place is achieved in that the respective magnetic flux linkages $\psi_{M1}$, $\psi_{M2}$ (see FIG. 6) have a phase displacement or an angular offset of preferably 90° in relation to one another. To enable a controlled drive of the two synchronous motors, one or both are equipped with a position sensor 2, wherein, on the basis of the invention, it is sufficient in principle for only one of the two synchronous motors M1, M2 to be scanned by a position sensor 2.

According to FIG. 2, for tension a train of gears, two synchronous motors M1, M2 are placed in positive engagement with a center gear wheel 3 via gear wheels that are coupled to their respective rotors. However, in most cases this gear wheel engagement is associated with undesirable play between the tooth flanks, which impairs the precision of positioning. To restrict or prevent gear wheel play, opposing torques or accelerations b1, b2 are again applied to the two synchronous motors M1, M2. In this manner, the opposing tooth flanks of gear wheels that are engaged with one another rest directly against one another without play, in other words they are tensioned. The synchronous motor rotors are then definitely fixed in terms of their angular position in relation to one another. Beyond this, the statements made in reference to FIG. 1 may be applied here accordingly.

According to FIG. 3, the two synchronous motors M1, M2 are preferably supplied with the same level of nominal current, connected in series, and from a shared power converter 4, for example an inverter. To this end, the leads of the motor phase windings $W_{U1}$, $W_{V1}$, $W_{W1}$ of the first torque synchronous motor M1 are directly connected to the power converter phase terminals U, V, W. The ends of the motor phase windings of the synchronous motor M1 are directly connected to the leads of the motor phase windings $W_{U2}$, $W_{V2}$, $W_{W2}$ of the second synchronous motor M2, in accordance with the series connection. According to FIG. 3, the ends of the phase windings of the second synchronous motor M2 are connected in a star connection, however they can also be connected in a delta connection. The sole power converter 4 is controlled via a control device 5, which is allocated to the two synchronous motors M1, M2 together.

According to FIG. 4, the control device 5 comprises, in a known manner, a speed command value/actual value comparison point 6, a speed controller 7 positioned downstream from this, preferably configured as a PI controller, with a limiter 8 at its output, and a current controller 9. The outputs of the current controller 9 for the quadrature and direct current components usq_ref, usd_ref serve to control a pulse-width modulator PWM, located downstream from the former, which is used in a known manner to control the power converter or inverter 4.

Between the speed controller 7, which supplies a command or reference value m_ref for a motor torque at its output, and the current controller 9, a device 10 for deriving a quadrature current component command value isq_ref, called "quadrature current command value controller" 10 in what follows, and downstream from this, a quadrature current command value/actual value comparator 11 are arranged. In the exemplary embodiment shown in FIG. 4, the quadrature current command value controller 10 comprises a multiplying element 12 for weighting the incoming motor torque control value m_ref with the reciprocal value of a magnetic flux linkage ψ, and a plus limiter 13 located downstream from it. This limits the quadrature current command value component isq_ref coming from the multiplying element 12 to a positive range.

In addition, between the speed controller 7 or the motor torque controller 7, 8, comprised of the output of the speed controller 7 and the limiter 8, and the current controller 9, a pretension torque controller 14 is arranged, the output of which is supplied, on one hand, to a first summing point 15. Its second input is connected to the output of the motor torque controller 7, 8. On the other hand, the output of the pretension torque controller 14 is connected via a sign reversing element 16 to a direct current command value controller 17, via the output of which a direct current command value component isd_ref is supplied to a direct current command value/actual value comparator 18. The direct current command value controller 17 also has a multiplying element 12 for the reciprocal weighting of the control value for a pretension torque with the magnetic flux linkage ψ and a negative output limiter 19. The latter limits the direct current command value isd_ref coming from the multiplying element 12 to a negative sign range – in a function analogous to that of the above-described positive limiter 13.

With the two positive and/or minus limiters, it is ensured, especially with respect to the application as a "tension mechanism," that each of the current components that form torque in the first synchronous motor M1 and in the second synchronous motor M2 have signs that are opposite one another, or the torques of the two motors M1, M2 work opposite one another to achieve tension. To this end, in accordance with the exemplary embodiment of FIG. 4, the tension torque controller 14 is arranged for outputting a constant reference value for the tension torque pretension_torque. The constant tension reference value expediently amounts to approximately 50% of the maximum motor torque, so that a residual motor torque control range of 50% can be used for actuation or control.

According to FIG. 5, to increase the available motor torque control range to approximately 100%, a second summing point 20 is arranged between the motor torque controller 7, 8 and the current controller 9, to the one input of which the output of the tension torque controller 14 with a negative sign is supplied. The output of the motor torque controller 7, 8 or the motor torque control value m_ref is supplied to the other input, without sign reversal. The output of the second summing point 20 is supplied to the direct current command value controller 17 (see above). In this manner, the motor torque command value, which is output from the speed controller 7, can be used to its full extent both for the quadrature current command value controller 10 and for the direct current command value controller 17. The reference value for the pretension_torque is additively or subtractively superposed over the first or the second summing point 15, 20. Whereas, in the exemplary embodiment according to FIG. 4, an adjustable torque range for an acceleration of –50% to +50% results, in the exemplary embodiment according to FIG. 5, an adjustable torque range for the acceleration of –100% to +100% is achieved. With the exemplary embodiment according to FIG. 5, the pretension torque controller 14 is expediently configured to be adjustable externally.

According to FIG. 6a-c, the magnetic flux linkage $\psi_{M2}$ of the second synchronous motor M2 is displaced electrically approximately 90° lagging because of mechanical couplings according to FIGS. 1 and 2, in the previous rotational direction, in relation to the magnetic flux linkage $\psi_{M1}$ of the first synchronous motor M1. The stator current components, namely the quadrature current components $i_{q1}$ and $i_{q2}$, and the direct current components $i_{d1}$ and $i_{d2}$ of the first or second synchronous motor M1 or M2, respectively, are represented in field coordinates for the operational conditions a—idle state—b—acceleration toward the left with respect to FIG. 1—and c—acceleration toward the right with respect to FIG. 1. Assuming that the two synchronous motors M1, M² [sic-Translator] are magnetically approximately 100% symmetrical, the torque can be calculated as follows for the exemplary embodiment of FIG. 4 (adjustable torque range: ±50%) for the three operational conditions a, b, c:

Operational Condition A—Idle State

An idle state is present when the torques of the two synchronous motors M1, M2 are at equal levels and are directed opposite one another, or have inverse signs. For this, the command value "torque 0" is issued by the current controller, in accordance with FIG. 4. Therefor, in each case only one control value of the same level for the tension torque pretension_torque is supplied to both the quadrature current command value controller 10 and the direct current command value controller 17, the latter with an inverse sign. The quadrature current components $i_{q1}, i_{q2}$ that result in the stators of the synchronous motors M1, M2 and are torque-forming are equal in terms of amount, however they have inverse signs. As a result, opposite torques of the same amount result from the respective vectorial products $\psi_{M1X} i_{q1}$ (for the first synchronous motor M1) and $\psi_{M2X} i_{q2}$ (for the second synchronous motor M2), resulting in the idle state.

Operational Condition B—Acceleration Toward the Left with Respect to FIG. 1

Based upon a motor torque control value $m_{ref}$, which is generated via the speed controller 7 and output via the motor torque controller 7, 8, a command value for increasing the quadrature current command value component is provided to the quadrature current command value controller 10 in accordance with FIG. 4, in which in the first summing point 15 a motor torque control value is added to the value for the tension torque pretension_torque. The quadrature current command value component isq_ref, which is increased significantly in this manner, is interpreted in the first synchronous motor M1 as an increased quadrature current iq1 with a corresponding increase in torque (see above-mentioned vectorial product with $\psi_{M1}$), whereas this increased current component acts in the second synchronous motor M2 only as flux-forming component id2. As a result, the first synchronous motor M1 applies a higher level of torque than the second for implementing the movement toward the left of the tension line 1, which can amount to a maximum of twice the torque of the second synchronous motor M2.

Operational Condition C—Acceleration Toward the Right According to FIG. 1

Based upon the corresponding motor torque control value output $m_{ref}$ with a negative sign from the motor torque controller 7, 8, once the tension torque command value having a positive sign has been added, a relatively significant lowering of the quadrature current command value component results in the quadrature current command value controller 10, which is illustrated in FIG. 6c by a correspondingly shortened vector for the quadrature current component $i_{q1}$. This current component acts in the second synchronous motor M2 as a flux-forming direct current component $i_{d2}$. Indicated next to this by a dashed line is the current vector or phasor, which corresponds to the pretention pretension_torque set to a constant. This is reflected, with its supply to the direct current command value controller 17, in the constant, torque-forming quadrature current component $i_{q2}$ of the second synchronous motor M2 (a corresponding current value is used in the first synchronous motor M1 only as flux forming). In this case, the torque applied by the first synchronous motor M1 amounts to only a fraction of the torque generated by the second synchronous motor M2, which is attributable solely to the fixed output of the tension torque controller 14.

According to FIG. 7, among the first and second motors M1,M2, respectively, the windings W2 of the second motor M2, which is not equipped with a position encoder or sensor, is short-circuited. This is accomplished by activating the switch S2 situated between the two motors M1, M2. Its individual switching elements connect the end terminals of said windings W2. Then only the motor M1 with the sensor G remains connected to the inverter. A basic idea of the invention comprises short-circuiting one of the two motors during the start-up phase, so that the other motor can be controlled and operated independently of the short-circuited motor.

Start-up approach: The second motor M2 is short-circuited and acts like a brake. The first motor M1, coupled to the position sensor G and its phase windings W1 now connected in a star connection, is controlled as a normal servo motor, and is moved to a defined position, until an increased current flow through the motor can be identified (for example via a current controller). If the current intensity increases substantially, that means that an intensified counter-torque is present as a load, for example due to the short-circuited and braking motor M2. It also means that the tension object, for example the gearing or the tension cable 1, has been tensioned. A partial sagging L1, L2 of the tension cable 1, indicated in FIG. 8 by a dashed line, has been eliminated.

Alternative start-up approach: First, the motor M1 with sensor, such as a servo motor, is moved to a defined, previously specified rotational position (first stop criterion). Whether or not the tension object is tensioned at this time is irrelevant. In a second step, the second motor M2 is then released from its short circuit, and is moved until an increased current flow through the first motor M1 can be detected (second stop criterion). This means that increased torques must be overcome, and the tension object has been tensioned.

According to FIG. 7, as for the start-up, the second motor M2 without a sensor is short-circuited. The first motor M1 is then moved until an increased current flow can be detected. This increased current flow occurs when the first motor M1 has to pull hard, for example against the motor M2, which is acting as a short-circuit brake. Although the exemplary embodiment shown in FIG. 1 illustrates the basic principle of the invention, a number of disadvantages still persist, for example with respect to flexible tension cables 1, as shown in FIG. 8.

On the tension cable 1 shown in FIG. 8, a central section A, which is not to be shifted or displaced, is marked. The end sections L1, L2, between which the central section A lies, are hanging slack multply at the beginning of the start-up phase. In the first start-up step, the first motor M1 with a sensor G is moved to a certain position (for example the previous end position when it was shut off) like a servo motor. The slack hanging end sections L1, L2 of the tension cable (indicated by a dashed line in FIG. 8) are not yet necessarily tensioned.

A further refinement of the start-up method of the invention: With the motor M1, because of its position encoder G, the end position occupied at the time of the previous shut-off can be stored, at which the motor M1 was switched off. The next time it is started up, it is moved first to this previous end position (first stop criterium). In this way, the initially slack end section L1 can also be retightened. The other, slack end section L2 can remain slack; it is coupled to the second motor M2 (without sensor).

With the tension mechanism shown in FIG. 8, it is required that the center cable section A not be shifted back and forth in a longitudinal direction, and instead remain tight. This central section ends in the two slack cable sections L1 and L2. A refinement on the basis of the invention now consists in the following (see also FIG. 9 with the associated text):

First, a first switch assembly S1 according to FIG. 9 is closed, with the result that the windings W2 of second motor M2 (without sensor) are bridged. For this purpose, each phase winding is allocated a switching element of the first switch assembly S1. Then only the first motor M1 with encoder G can be controlled. This is then controlled in such a way that the servo motor M1 is moved back to a previously vacated end point (first stop criterion). This causes the one slack end section L1 to be tightened. Due to certain circumstances, the center section A is not to be shifted or displaced. The second slack end section L2 at first remains slack. In the subsequent step, the first switch assembly S1 is opened and a second switch assembly S2 (arranged between said two motors M1,M2) or its switching elements, respectively are closed. The servo motor M1 is then short-circuited and acts as an electrodynamic brake. This offers the advantage that the one end section L1 remains tight. For the second "special motor" M2, a position detection in any form is also expedient, whether this is accomplished by means of an extra sensor or software using an injection technique and/or a motor model (so-called "sensorless method"). The special motor M2, also called a "slave," is then moved, in the proper direction according to a position detection, until an increased current flow can be detected by an current controller on the basis of the increased load torque (second stop criterion). The tension mechanism is then fully operational and the start-up procedure can switch over into normal operation.

According to FIG. 9, the drive system comprises a drive motor and a tension motor, wherein one M1 of the two motors is preferably a standard synchronous motor with an encoder G. The other second motor M2 is a special motor, the winding ends of which are configured on a terminal board, and the windings of which can be short-circuited or bridged via the first switch assembly (S1). Further, there is a second switch assembly (S2), which makes it possible to short-circuit all poles of the connection between the two motors. This short circuit is preferably implemented via switching elements, which are integrated into the special motor M2, so that in a series connection of these two motors (M1 and M2), either the motor M1 or the motor M2 can be separately controlled using the short-circuit switches.

LIST OF REFERENCE SYMBOLS

M1 first synchronous motor
M2 second (special) motor without sensor
1 Tension line
b1, b2 Acceleration
$\psi_{m1}, \psi_{m2}$ Flux linkage of the first or second synchronous motor
2 Position sensor
3 Gear wheel
4 Power converter
$W_{u1,2}$ Motor torque phase winding
$W_{V1,2}$ Motor torque phase winding
$W_{W1,2}$ Motor torque phase winding
U, V, W Power converter phase terminals
5 Control device
6 Speed command value/actual value comparative point
7 Speed controller
8 Limiter
9 Current controller
usq_ref Quadrature current component
usd_ref Direct current component PWM Pulse width modulator
m_ref Motor torque control value
isq_ref Quadrature current component command value
10 Quadrature current command value controller
11 Quadrature current command value/actual value comparator
12 Multiplier element
ψ Magnetic flux linkage
13 Plus limiter
7, 8 Motor torque controller
14 Tension torque controller
15 First summing point
16 Sign reversing element
17 Direct current command value controller
18 Direct current command value/actual value comparator
isd_ref Direct current command value component
19 Negative limiter
bias_torque Pretension torque
20 Second summing point
$i_{q1}$, $i_{q2}$ Quadrature current components of the first or second synchronous motor M1 or M2, respectively
$i_{d1}$, $i_{d2}$ Direct current component
V Angular offset
G sensor
W1,W2 motor windings
L1,L2 end sections of tension line 1
U,V,W phases

The invention claimed is:

1. Field-oriented control method for an electric drive comprising a plurality of electric motors, for implementing a tension mechanism, for load cable and/or gearing means (1, 3), using measurements of a polyphase motor actual current (U, V, W), the measured values of which are transformed into a direct current component and a quadrature current component, based upon a magnetic rotor field or flux angle, in a rotor flux-based d,q coordinate system, and the quadrature and direct current components from the actual current are subjected to a comparison with predetermined quadrature and direct current components (isq_ref, isd_ref) of a current command value, with the following steps:
   a) two synchronous motors (M1, M2) are used as electric motors
   b) the magnet wheels or rotors of the two synchronous motors (M1, M2) are rotated or oriented toward one another and are then mechanically coupled in such a way that between their magnetic flux linkages ($\psi_{m1}$, $\psi_{m2}$) or other magnetic fluxes an angular offset (V) is formed
   c) the two synchronous motors are each supplied with or traversed by the same phase currents, from a shared power converter
   d) for a pretension torque, a command or reference value is predetermined, and is superposed on a motor torque control value (m_ref) output by a controller (7), from which a quadrature current component (isq_ref) for the current command value is derived
   e) a direct current component (isd_ref) for the current command value is derived from the predetermined tension torque control value (m_ref) with sign reversal.

2. Control method according to claim 1, characterized in that in a continuous operation, the pretension torque control value (m_ref) and/or angular offset (V) are held constant.

3. Control method according to claim 1, characterized in that a current component is used in the first synchronous motor (M1) as torque-forming quadrature current component ($i_{q1}$) or as flux-forming direct current component ($i_{d1}$) and at the same time is used in the second synchronous motor (M2) as flux-forming direct current component ($i_{d2}$) or as torque-forming quadrature current component ($i_{q2}$), respectively.

4. Control method according to claim 1, characterized in that, in each case based upon amount and phase, the quadrature current component ($i_{q1}$) in the first synchronous motor (M1) corresponds with the direct current component ($i_{d2}$) in the second synchronous motor (M2), and the direct current component ($i_{d1}$) in the first synchronous motor (M1) corresponds with the quadrature current component ($i_{q2}$) in the second synchronous motor (M2).

5. Operating method for a drive for tensioning an object that may be flexible or subject to play, in which at least two electric motors (M1, M2), which may be operated as polyphase motors, are brought into engagement with opposing forces on said object, using a control and/or regulating device (WR, G) that controls the electric motors, characterized in that, for starting or starting up when the tension drive is in an idle or currentless switched-off state, first only one (M1) of the two electric motors is actuated to a tensioning movement, until a pre-specified first stop criterion is detected by the control and/or regulating device (WR, G).

6. Operating method according to claim 5, characterized in that, after detection of said first stop criterion, the second electric motor (M2) is actuated to a tensioning movement, until a pre-specified second stop criterion is detected by the control and/or regulating device (WR, G).

7. Operating method according to claim 5, characterized in that, during the actuation of the first or second electric motor (M1, M2), the respective other electric motor is short-circuited and/or otherwise decoupled from the control and/or regulating device (WR, G).

8. Operating method according to claim 5, characterized in that, to decouple one or both of the electric motors (M1, M2) from the control and/or regulating device (WR, G), in one of the electric motors (M1) the phase windings (W1) at the two respective ends are short-circuited preferably in a star or delta connection, and in the other electric motor (M2) the respective phase windings are bridged and/or connected together at both of its ends.

9. Operating method according to claim 5, characterized in that, during the actuation of one of the electric motors (M1, M2), the respective other motor is used as an electrodynamic brake by a short-circuiting (S1, S2) of its phase windings.

10. Operating method according to claim 5, characterized in that an increase in the motor current flow and/or achieving a predetermined motor position and/or a predetermined timing period serves as a stop criterion.

11. Electric motor arrangement, for a tension mechanism, comprising load cable and/or gearing means (1, 3), with at least two electric motors, each of which can be operated as a polyphase motor, characterized by the following characterizing features:
   a) the two electric motors are embodied as synchronous motors (M1, M2),
   b) the synchronous motors are connected to one another in series via their phase windings ($W_{U1,\,U2}$, $W_{V1,\,V2}$, $W_{W1,\,W2}$; U1, U2; V1, V2; W1, W2)
   c) the synchronous motors (M1, M2) are coupled with a shared power converter (4) to power them,
   d) the synchronous motors (M1, M2) are mechanically coupled with one another via their magnet wheels or rotors in such a way that they are offset from one another in terms of their angular position, and/or their magnetic flux linkages ($\psi_{m1}$, $\psi_{m2}$) or other magnetic alignments form an offset angle (V) with one another.

12. Electric motor arrangement according to claim 11, characterized in that the angular offset (V) of the magnet wheels or rotors and/or their magnetic alignments in relation to one another amounts to 90 degrees, or lies between 0 degrees and ±180 degrees.

13. Electric motor arrangement according to claim 11, characterized in that the mechanical coupling between the rotors or magnet wheels is implemented using load cable or gearing means (1, 3).

14. Electric motor arrangement according to claim 13, characterized in that the load cable or gearing means (1, 3) comprise a tightly drawn tension line or gear wheels that are engaged with one another and are tensioned on their adjacent tooth flanks.

15. Electric motor arrangement according to claim 11, characterized in that a first of the two synchronous motors (M1, M2) is connected directly to the power converter (4) via its phase windings ($W_{U1}$, $W_{V1}$, $W_{W1}$), and the second synchronous motor (M2) is supplied with or receives current from the power converter (4) indirectly via the first synchronous motor (M1).

16. Electric motor arrangement according to claim 11, characterized in that in the synchronous motor that is arranged in the last position with respect to the shared power converter in a synchronous motor series, the phase windings $W_{U2}$, $W_{V2}$, $W_{W2}$) are connected in a star or delta connection, whereas in the other synchronous motor or motors (Mit1), which are not arranged in the last position, the leads and ends of its phase windings ($W_{U1}$, $W_{V1}$, $W_{W1}$) are available for external connection with the power converter (4) or with an adjacent synchronous motor (M2).

17. Electric motor arrangement according to claim 11, characterized in that, to implement a drive control circuit, one or both synchronous motors (M1, M2) are provided with a device (2) for position sensing, the output of which is supplied to a control device (5) that controls the power converter (4).

18. Electric motor arrangement according to claim 11, characterized in that a shared control device (5), which comprises a position and/or speed controller (7), is allocated to the synchronous motors (M1, M2), and is coupled to the power converter (4,WR) for its control.

19. Electric motor arrangement according to claim 11, for a tensioning mechanism with load cable and/or gearing means, with at least two electric motors that can be operated as polyphase motors, which are coupled to a shared control and/or regulating device (WR, G), characterized in that the phase windings of one or both electric motors (M1, M2) are equipped with switching elements (S1, S2), which are arranged for decoupling one or both electric motors (M1. M2) from the control and/or regulating device (WR, G).

20. Electric motor arrangement according to claim 19, characterized in that the switching means (S1, S2) are embodied entirely or partially as switches (S2) that bridge motor windings (W2) at their ends, or as switches (S2) that connect different phases (U2, V2, W2).

21. Electric motor arrangement according to claim 19, characterized in that the switching means (S1, S2) are configured to be operable via the control and/or regulating device (WR, G).

22. Position and/or speed controller for the field-oriented control of an electric drive, according to claim 11, with at least one device (7, 8) for calculating and outputting a motor torque command value (mit_ref) (called "motor torque controller" in what follows), from the output or outputs of which, based upon a rotor flux-based d,q coordinate system, a quadrature current command value component (isq_ref) for a quadrature current controller located downstream is derived and output, characterized by a device (14) for generating a pretension torque control value (called "pretention torque controller" in what follows), the output or outputs of which are linked on one side to the output of the motor torque controller (7, 8) and on the other side are supplied to a device (17) for deriving a direct current command value component (isd_ret) (called "direct current command value controller" in what follows) for a direct current controller located downstream.

23. Controller according to claim 22, characterized in that the outputs of the motor torque controller (7, 8) and the pretension torque controller (14) are additively linked with one another, especially via a summing point (15).

24. Controller according to claim 22, characterized in that the pretension torque controller output is connected to the direct current command value controller ($1/\psi$) for the purpose of deriving the direct current command value (isd_ref) via a sign reversal element (1).

25. Controller according to claim 22, characterized in that, in addition to the pretension torque controller output, the output of the motor torque controller (7, 8) is coupled with the input of the direct current command value controller ($1/\psi$).

26. Controller according to claim 22, characterized in that a summing point (20) is arranged at the input of the direct current command value controller (17), via which the output value of the pretension torque controller (14) is subtracted from the output value of the motor torque controller (7, 8), and the result of the subtraction is supplied to the input of the direct current command value controller (17; 12, $1/\psi$, 19).

27. Controller according to claim 22, characterized in that the pretension torque controller (14) has a preferably externally operable input for adjusting the pretension torque.

28. Controller according to claim 22, characterized in that the output of the pretension torque controller (14) is supplied to a summing point (20), with sign inversion (16), the second input of which is connected to the output of the motor torque controller (7, 8), and the summing point outputs are connected to the input of the direct current command value controller (17; 12, $1/\psi$, 19) for deriving the direct current command value (isd_ref).

29. Controller according to claim 22, characterized in that each of the quadrature and direct current command value outputs (isq_ref, isd-ref) is equipped with a limiter element (13, 19), which are configured to restrict the outputs to ranges having signs that are opposite one another.

30. Controller according to claim 22, characterized in that the pretension torque controller (14) is adjusted and/or configured to output a control value, which corresponds to 50 percent or approximately 50 percent of the maximum possible motor torque, to the respective input of the devices (10, 19, $1/\psi$) for the purpose of deriving a quadrature current and/or direct current command value (isq_ref, isd_ref).

* * * * *

UNITED STATES PATENT AND TRADEMARK OFFICE
CERTIFICATE OF CORRECTION

| | | |
|---|---|---|
| PATENT NO. | : 7,944,158 B2 | Page 1 of 1 |
| APPLICATION NO. | : 12/238860 | |
| DATED | : May 17, 2011 | |
| INVENTOR(S) | : Jinsheng Jiang and Viktor Barinberg | |

It is certified that error appears in the above-identified patent and that said Letters Patent is hereby corrected as shown below:

Column 14, Claim 24, line 23, after the beginning parenthesis and before number 1 insert -- - -- to appear as:

...sign reversal element (-1).

Signed and Sealed this

Twenty-eighth Day of June, 2011

David J. Kappos
*Director of the United States Patent and Trademark Office*